United States Patent [19]

Lawrenson et al.

[11] 3,915,683

[45] *Oct. 28, 1975

[54] METHOD FOR MANUFACTURE OF FLOAT GLASS

[75] Inventors: Jack Lawrenson, St. Helens; Albert Sidney Robinson, Southport, both of England

[73] Assignee: Pilkington Brothers Limited, England

[ * ] Notice: The portion of the term of this patent subsequent to Apr. 4, 1989, has been disclaimed.

[22] Filed: May 6, 1974

[21] Appl. No.: 467,602

Related U.S. Application Data

[63] Continuation of Ser. No. 228,901, Feb. 24, 1972, abandoned, which is a continuation-in-part of Ser. No. 810,248, March 25, 1969, Pat. No. 3,658,501.

[30] Foreign Application Priority Data

Apr. 9, 1968 United Kingdom............... 17077/68

[52] U.S. Cl...................... 65/99 A; 65/30; 204/225
[51] Int. Cl.²......................................... C03B 19/02
[58] Field of Search...... 65/99 A, 182 R, 101, 30 R; 204/224 M, 224 R, 225, 226

[56] References Cited
UNITED STATES PATENTS

| | | | |
|---|---|---|---|
| 3,607,175 | 9/1971 | Robinson........................ | 65/99 A X |
| 3,607,177 | 9/1971 | Robinson et al................ | 65/99 A X |
| 3,616,428 | 10/1971 | Bogue........................ | 204/224 M X |
| 3,620,954 | 11/1971 | Ziegler et al.................. | 204/225 X |

Primary Examiner—Robert L. Lindsay, Jr.
Attorney, Agent, or Firm—Burns, Doane, Swecker & Mathis

[57] ABSTRACT

Float glass is manufactured with predetermined characteristics imparted to the glass by a body of molten material which clings to an electrode bar extending across the path of travel of a ribbon of float glass and which contacts the upper surface of the glass ribbon. The whole underface of the electrode bar is continuously or intermittently renewed to compensate for any erosion of the electrode bar by the molten material.

3 Claims, 8 Drawing Figures

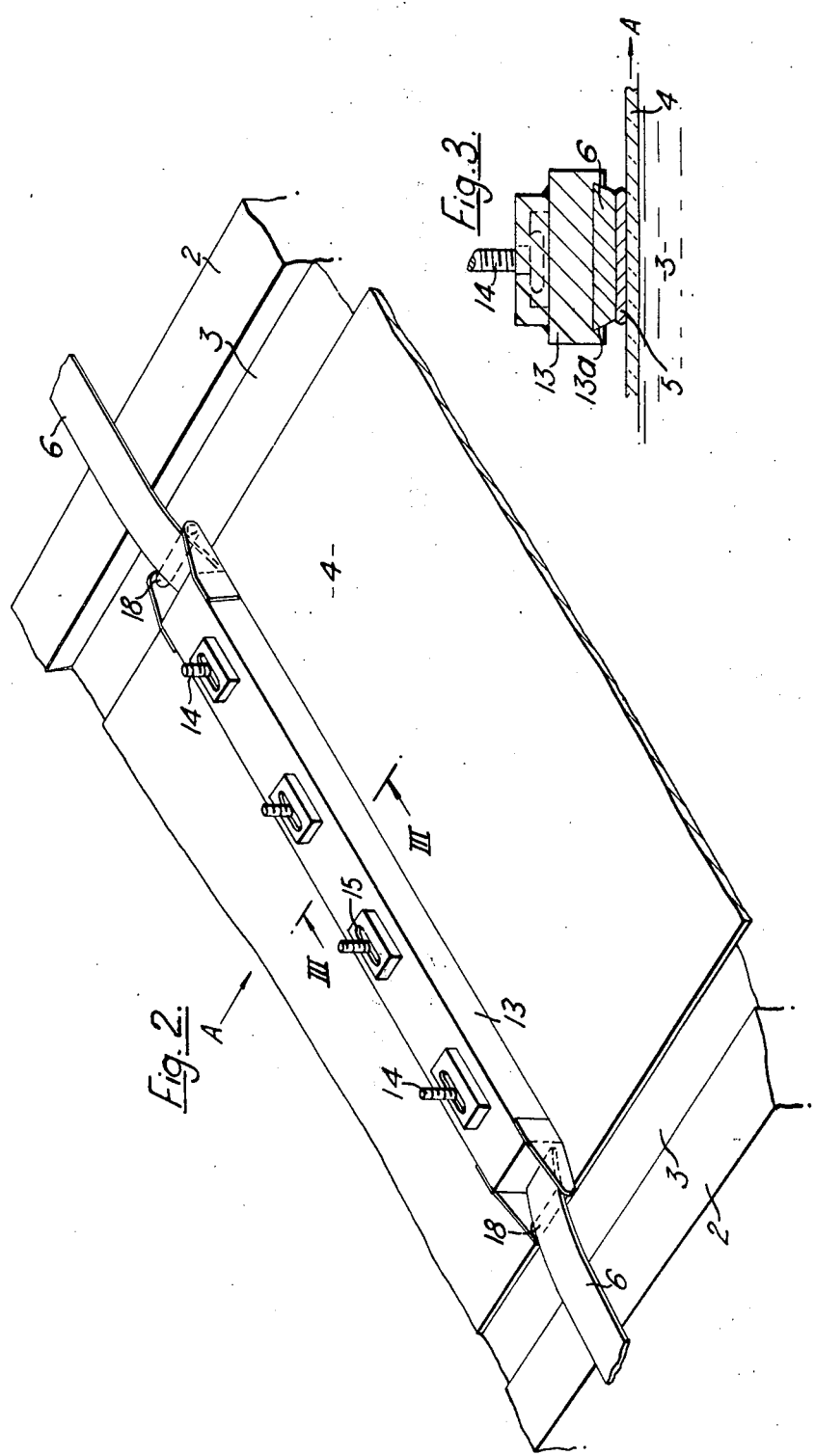

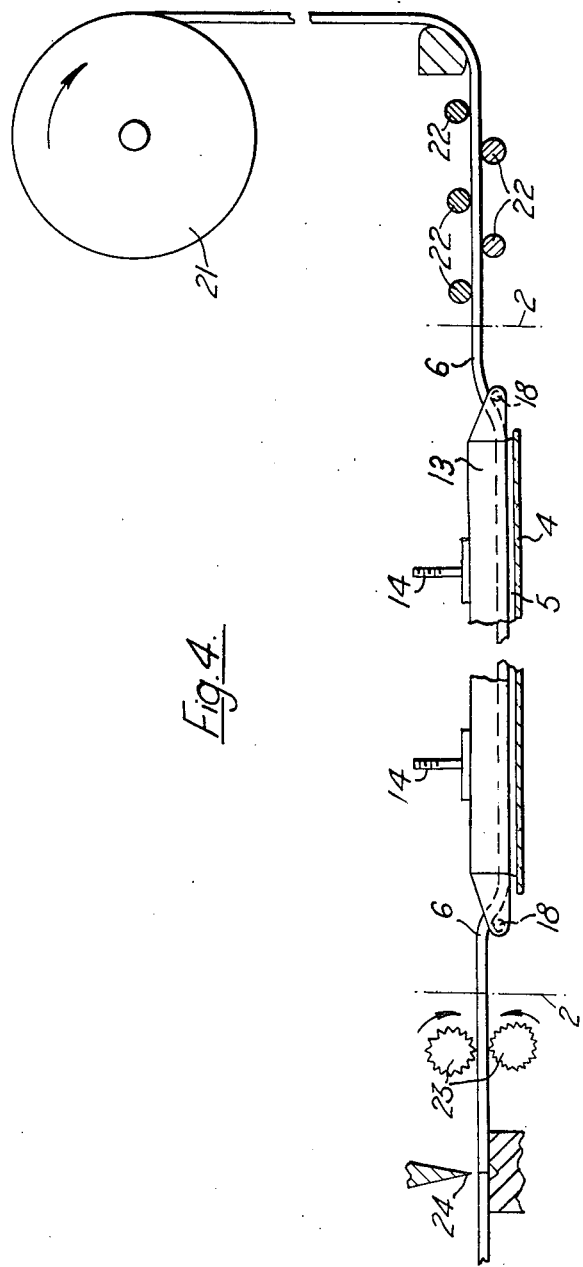

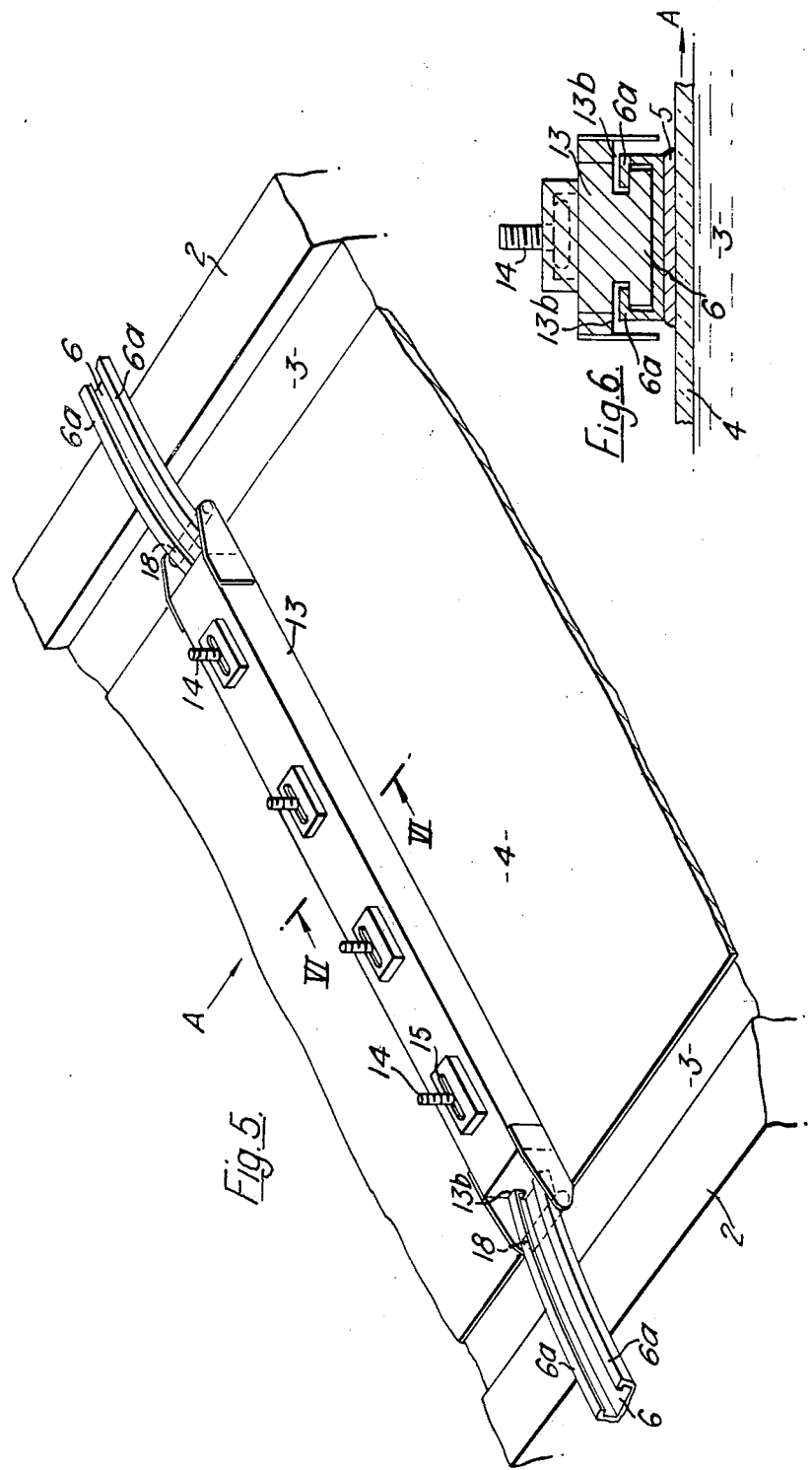

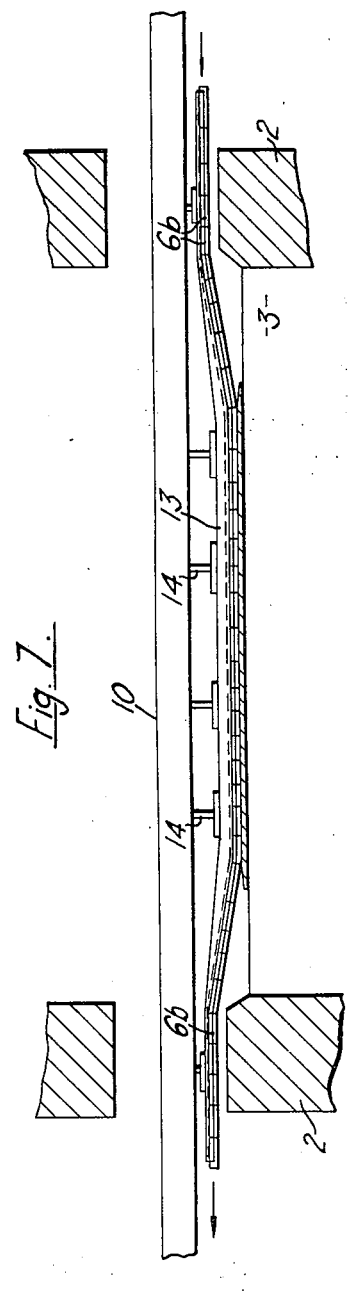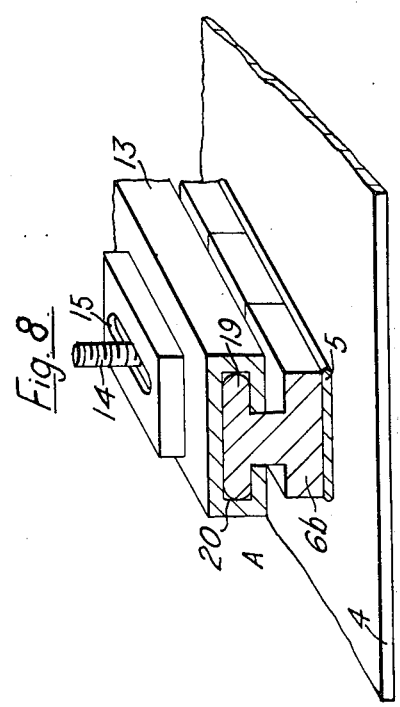

METHOD FOR MANUFACTURE OF FLOAT GLASS

BACKGROUND OF THE INVENTION

This is a continuation of application Ser. No. 228,901, filed Feb. 24, 1972 now abandoned, which application is a continuation-in-part application of application, Ser. No. 810,248, filed Mar. 25, 1969, now U.S. Pat. No. 3,658,501) and entitled "Manufacture of Glass".

This invention relates to the manufacture of float glass, and more especially the invention concerns processes and apparatus for producing float glass in which predetermined characteristics are imparted to the glass by migration of an element or elements into the glass from a body of molten material which is held in contact with the surface of the glass.

In such processes the body of molten material may be a molten metal or molten alloy which clings to a locating member positioned adjacent the glass surface. Relative movement is effected between the glass and the locating member, and the molten body is maintained in position by clinging to the locating member. The migration of the element or elements into the glass from the body is controlled, for example, by regulating the oxidising conditions at the interface between the glass and the body. Alternatively, an electrolytic method may be used, in which the locating member acts as an electrode and current is passed through the glass (which is electrically conductive at the elevated temperatures of treatment) from the molten body to effect controlled migration of an element or elements from the molten body into the glass.

As the treatment process proceeds, material from the locating member is under certain conditions dissolved by the molten body, resulting in an appearance of wear of the lower part of the locating member.

It is a main object of the present invention to maintain a desired uniformity of characteristic in the treated glass by maintaining constant the intensity of treatment of each part of the glass throughout a manufacturing run of the process.

SUMMARY

According to the invention there is provided a method of producing float glass in which predetermined characteristics are imparted to the glass from a body of molten metal which contacts a surface of a ribbon of float glass and which clings to a locating member positioned adjacent the upper surface of the ribbon of glass which is advancing along a molten metal bath. The lower face of the locating member is traversed across the bath to renew said lower face to which the molten metal body clings.

It has been found that parts of the locating member to which the molten body clings are more susceptible to wear than the rest of the locating member. Wear has been found at the front and rear faces of the lower part of the locating member. The invention obviates this wear by providing that the lower face of the locating member is continuously or intermittently renewed.

BRIEF DESCRIPTION OF THE DRAWINGS

FIG. 2 is a diagrammatic perspective view of an embodiment of the invention which employs a replaceable locating member which can be moved continuously or intermittently, FIG. 3 is a section on line III—III of FIG. 2, FIG. 4 is a diagrammatic elevation illustrating a feeding arrangement for the locating member in the apparatus of FIGS. 2 and 3, FIG. 5 is a view similar to FIG. 2 of another modified form of apparatus including a continuously replaceable locating member, FIG. 6 is a section on line VI—VI of FIG. 5, FIG. 7 is a diagrammatic part-sectional elevation of an apparatus according to a further embodiment of the invention in which the locating member is constituted by a series of movable blocks, and FIG. 8 is a partly sectioned perspective view of part of the locating member in the apparatus of FIG. 7.

DESCRIPTION OF THE PREFERRED EMBODIMENTS

Figure 1:
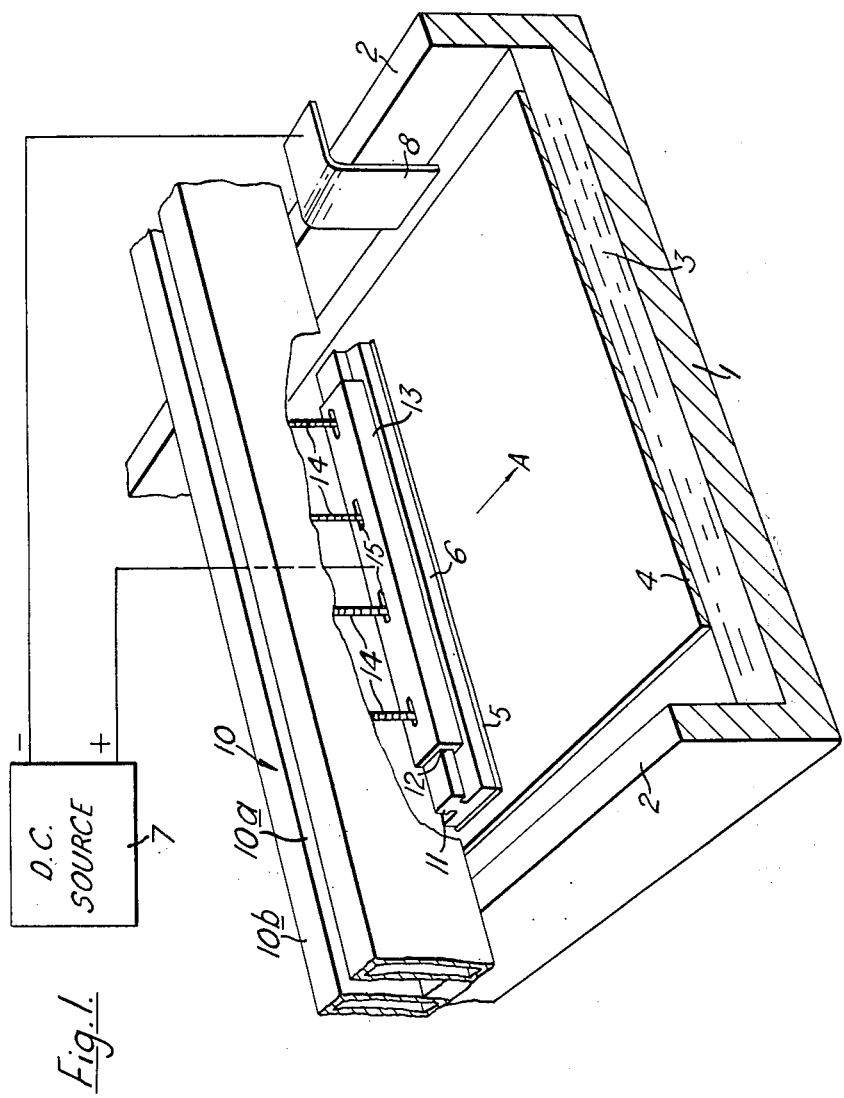
FIG. 1 is a diagrammatic partly cut-away perspective view of an apparatus for treating glass in sheet form to which the present invention is applicable.

Soda-lime-silica glass, for example, is fed on to the bath 3 at a controlled rate, either as preformed ribbon of glass or as molten glass which is poured on to the bath at one end thereof and permitted to flow laterally unhindered to the limit of its free flow under the influence of surface tension and gravitational forces to form a flat ribbon 4 of glass which is advanced along the surface of the bath in the direction of arrow A.

The temperature of the glass ribbon 4 is regulated as the ribbon is advanced along the bath by means of controlled heaters (not shown) immersed in the bath 3 and located in the said headspace over the bath 3.

A body 3 of molten material for modifying the upper surface of the glass is maintained in contact with the upper face of the ribbon 4, the body 5 extending across the ribbon transversely of the direction of advance A thereof at a fixed station in the tank structure. The molten body 5, which does not wet the surface of the glass, is maintained in position by an elongated locating member 6 extending transversely across the ribbon 4 and parallel to the upper face thereof, so that a gap of uniform depth (for example, about 3 to 4 mm) is maintained between the lower surface of the member 6 and the upper face of the ribbon 4.

The molten material of the body 5 wets the lower surface of the locating member 6 and clings thereto, so that as the ribbon 4 passes continuously beneath the body 5, the latter is confined by the member 6 to the gap between the member 6 and the ribbon 4.

The molten material of the body 5 may comprise a metal, an alloy or a salt. For example, the material may be tin, lead, bismuth, antimony, indium, zinc, or thallium. Examples of suitable molten alloys are alloys of tin or lead or bismuth as a solvent metal with lithium, sodium, potassium, zinc, magnesium, copper, or silver as a solute metal. Sodium chloride is an example of a molten salt which may be used.

The locating member 6 may be of an unreactive metal, for example, one of the platinum group metals. Alternatively, the member 6 may comprise a base of, for example, copper, silver, brass, steel, alloys, containing copper or silver.

As the glass ribbon 4 passes beneath the molten body, its surface is modified by migration of one or more elements from the body 5 into the glass surface.

In a preferred electrolytic process the migration is controlled by passing a regulated electric current through the body 5 and the ribbon 4 to cause transfer of ions from the body 5 into the glass. For this purpose the locating member 6, which is electrically conductive, is connected to the positive terminal of a direct current supply source 7 so that the molten body 5 acts as an anode and the bath 3 as a cathode of an electrolytic circuit, the glass of the ribbon 4 being the electrolyte. A negative electrode 8 connected to the negative terminal of the source 7 is immersed in the molten metal bath 3 on one side of the ribbon 4.

The surface modification of the glass ribbon 4 may alternatively be regulated by controlling oxidising conditions in the body 5 so as to regulate the migration of an element or elements from the body 5 into the glass.

A supply duct (not shown) is provided in the headspace adjacent the member 6 for replenishing the body 5 of molten material with the element (or elements) which migrates into the glass ribbon 4 in operation of the apparatus.

In order to ensure uniform surface treatment of the glass ribbon across its width, it is important to ensure that there is no variation in the size of the gap between the lower surface of the locating member 6 and the upper face of the ribbon 4 along the width of the ribbon. With this object in view the locating member 6 is supported from a rigid beam structure 10 extending transversely over the bath 3.

The beam structure 10 is shown partially brokenaway in FIG. 1 for the sake of clarity. The beam structure 10 comprises two parallel juxtaposed box-section hollow beams 10a, 10b, through which a coolant fluid, conveniently water, is circulated so as to maintain the beam structure 10 at a temperature which is considerably lower than the temperature of the molten body 5 and locating member 6, which temperature is typically of the order of 700°C.

The locating member 6 comprises an elongated strip having a flat lower face, parallel to the surface of the ribbon 4 to which the molten body 5 clings. Along its upper surface the member 6 is provided with an elongated key 11 which fits into a keyway 12 provided in an elongated support holder 13. In this way the member 6 is free to undergo thermal expansion relative to the holder 13 without restraint, and therefore without the occurrence of any deformation.

The holder 13 is suspended from the beam structure 10 by a plurality, (four in the illustrated example) of support members 14, each of which has enlarged T-shaped head which is located in longitudinally extending slots 15 provided in the upper surface of the holder 13. The spacing of the support members 14 along the holder 13 is so chosen that the natural bending of the holder and locating member 6 between adjacent support members 14 is less than an acceptable maximum. To compensate for the tendency of the supported holder 13 and locating member 6 to flex under gravity between the outer ends of the beam structure 10 at least the centre ones of the support members 14 are made adjustable in length. For example, the support members 14 may comprise respective screw-jack devices. A linkage is preferably provided for permitting adjustment of the support members 14 from positions externally of the tank structure.

By suitably adjusting the support members 14 and end supports (not shown) for the beam structure 10 the height of the gap between the locating member 6 and the ribbon 4 can be maintained uniform within acceptable limits over the length of the member 6.

It will be appreciated that the molten material in the body 5 is not static in operation of the apparatus, even through the body 5 as a whole is held in the same position by clinging to the locating member. Since the lower face of the molten body 5 is in contact with the upper surface of the advancing glass ribbon 4, material in the body 5 close to the ribbon 4 is carried along with the glass. A return flow in the opposite direction takes place in the molten material close to the lower face of the locating member 6 resulting in some wear of the locating member which in some instances is due to dissolving of the material of the locating member 6 into the molten body 5, for example when the molten body 5 is a copper-lead alloy and the locating member 6 is a copper bar. Any such wear of the bottom of the locating member is usually uneven.

In the course of time erosion of the trailing edge of the locating member 6 may locally increase the gap between the lower face of the member 6 and the upper face of the ribbon 4, to an extent such that the molten material can no longer remain in that part of the gap by surface tension. As a result, the molten body 5 may recede unevenly from the eroded edge of the locating member 6.

The present invention avoids any such difficulty by renewing the lower face of the locating member during operation of the process, thereby ensuring that the length of the molten body 5 in any section therethrough in the direction of glass advance is maintained substantially constant, so that the method can be used with reliable results with high rates of glass movement and with high currents.

The locating member 6 may be continuously replaced. FIGS. 2 to 4 illustrate one form of apparatus employing such an arrangement. The holder 13 is formed with a dovetail keyway slot 13a in its lower face, in which slot a continuous strip-like locating member 6, for example of extruded copper, is slidably fitted. The copper strip comprising the locating member 6 is continuously fed into the holder 13 from one end thereof from a supply reel 21 (FIG. 4) which may conveniently hold a 100-foot length of strip, and is passed between a plurality of straightening rollers 22 outside the tank structure before being drawn into the bath headspace. The strip is drawn through the rollers 22 and the holder 13 at a controllable feed rate of, for example 1 cm to 5 cm per minute, by traction applied to the strip leaving the tank structure, by a pair of toothed drive rollers 23 engaging the strip externally of the other tank side wall 3.

After passing through the drive rollers 23 the used strip 6 is cut up by a guillotine 24 into short sections which are convenient to handle the remelting. Alternatively, the used strip may be wound up on a collecting drum.

Guide rollers 18 are supported by the holder 13 at the opposite ends thereof to bend the strip 16 as it is fed into and from the groove 13a and thereby ensure that the molten metal body 5 is contained within the confines of the edges of the ribbon. A typical rate of feed of the locating member strip 6 is about 2.5 cm per minute, and when the ribbon of glass is 3 meters wide the locating member is completely replaced in 2 hours. In this time there has not been any appreciable wear of the strip by the molten body 3 which clings to the undersurface of the strip.

Instead of a continuously moving locating member 6, as intermittently moving member 6 may be employed. Further instead of using a locating member 6 in the form of flat strip, a member in the form of continuous strip of partly closed channel section may be used, as illustrated in FIG. 5 and 6. In this modification the inwardly-turned edges 6a of the channel-section strip constituting the locating member 6 are slidably received in respective slots 13b in the side faces of the holder 13.

FIGS. 7 and 8 show a further modification in which the replaceable locating member 6, instead of being continuous, comprises a succession of juxtaposed blocks 6b, for example of copper. Each block 6b has an integral T-shaped head 19 and the heads 19 of the blocks 6b slide in an elongated keyway 20 formed in the undersurface of a channel-section holder 13. The blocks 6' are advanced at a steady rate, for example 2.5 cm per minute, along the holder 13 through the side walls 2 of the tank structure by means of the ramped shape of the holder 13 illustrated in FIG. 7.

We claim:

1. In a process of imparting surface characteristics to a ribbon of float glass during manufacture thereof, with improved maintenance of the intensity of treatment and uniformity of the imparted characteristics to a run of glass, the steps of:

advancing the ribbon of float glass along a molten metal bath provided in an elongated tank structure;

causing a molten metal body for modifying the glass to cling to the lower face, soluble in the molten metal body, of a locating member extending across and parallel to the upper surface of said ribbon to locate said molten metal body in a predetermined position on the upper surface of said advancing ribbon of glass, in which position the extent of said molten metal body in the direction of advance of the ribbon of glass is substantially codimensional with that of the locating member, and in which position relative movement occurs between the molten metal of said body and said lower face in a manner such that the ribbon of glass tends to carry the molten metal of said body in the direction of ribbon advance and a return flow of the molten metal of the body takes place in the opposite direction;

enforcing migration of an element from said molten metal body into said glass surface to impart surface characteristics to said glass ribbon; and moving the locating member transversely across said molten metal body to renew said lower face to which the molten body clings;

the step of transversely moving the locating member being performed during said relative movement between said lower face and the clinging molten metal of said body, and being performed while said clinging molten metal body is maintained, during movement of the locating member, in its located position clinging to said lower face of said locating member and on the upper surface of said advancing ribbon of glass, thereby to maintain substantially uniform the extent of the located molten metal body in the direction of advance of the float glass ribbon during said return flow of the molten metal of the body in the opposite direction and to improve maintenance of the intensity of treatment and uniformity of the imparted characteristics to a run of glass.

2. A process according to claim 1, comprising traversing the locating member continuously across the bath to renew said face continuously.

3. In a process of imparting surface characteristics to a ribbon of float glass during manufacture thereof, with improved maintenance of the intensity of treatment and uniformity of the imparted characteristics to a run of glass, the steps of:

advancing the ribbon of float glass along a molten metal bath provided in an elongated tank structure;

causing a molten metal body for modifying the glass to cling to the lower face of a locating member extending across and parallel to the upper surface of said ribbon to locate said molten metal body in a predetermined position on the upper surface of the advancing ribbon of glass, in which position the extent of said molten metal body in the direction of advance of the ribbon of glass is substantially condimensional with that of the locating member, and in which position relative movement occurs between the molten metal of said body and said lower face in a manner such that the ribbon of glass tends to carry the molten metal of said body in the direction of ribbon advance and a return flow of the molten metal of the body takes place in the opposite direction;

enforcing migration of an element from said molten metal body into said glass surface to impart surface characteristics to said glass ribbon; and moving the locating member transversely across said molten metal body to renew said lower face to which the molten metal body clings;

the step of transversely moving the locating member being performed during said relative movement between said lower face and the clinging molten metal of said body, and being performed while said clinging molten metal body is maintained, during movement of the locating member, in its located position clinging to said lower face of said locating member and on the upper surface of said advancing ribbon of glass, thereby to maintain substantially uniform the extent of the located molten metal body in the direction of advance of the float glass ribbon during said return flow of the molten metal of the body in the opposite direction, and to improve maintanance of the intensity of treatment and uniformity of the imparted characteristics to a run of glass.

* * * * *